Aug. 18, 1931.  F. J. JACOBI  1,819,682
MOTOR VEHICLE HEADLIGHT
Filed Feb. 26, 1930  3 Sheets-Sheet 1
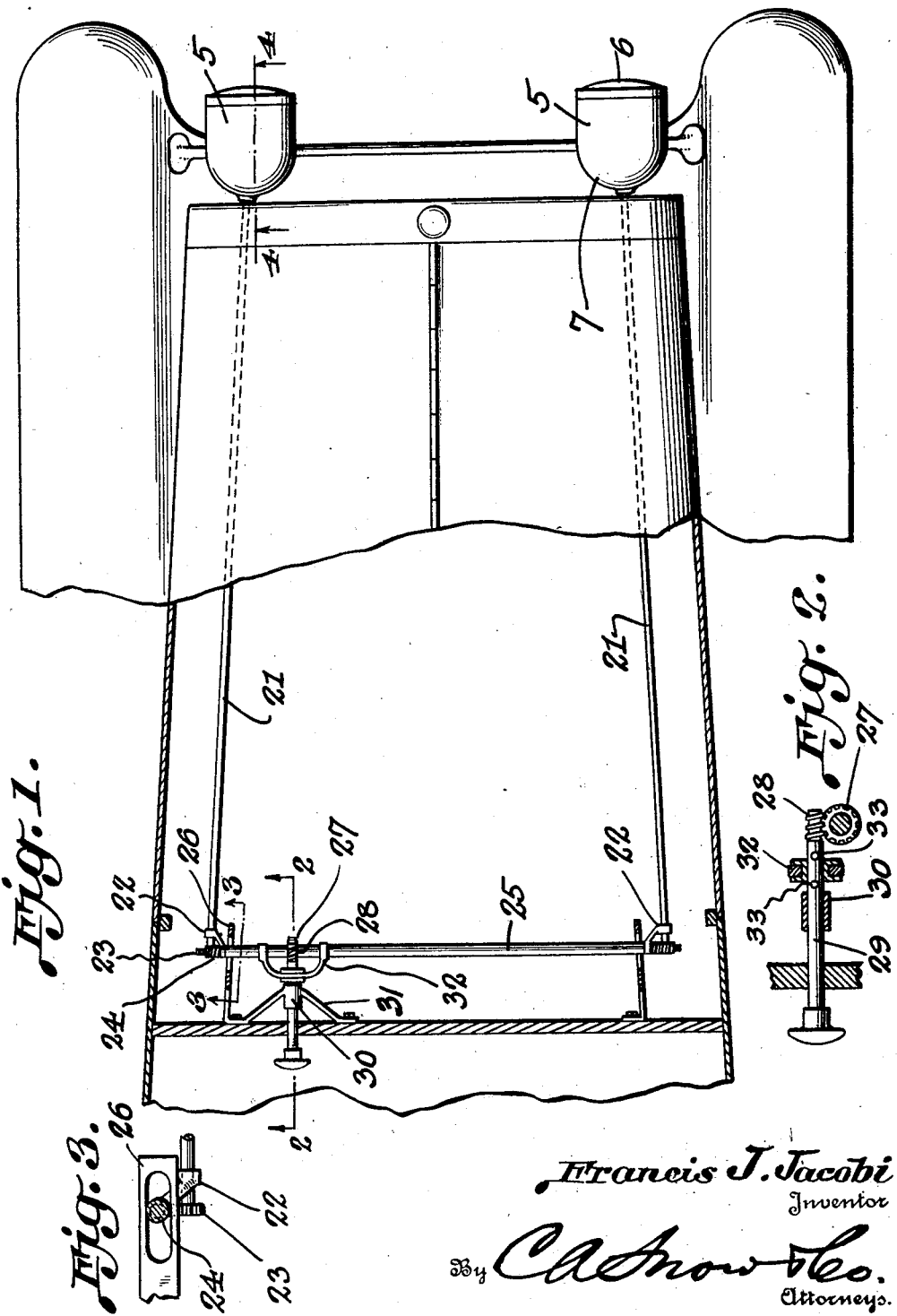
Francis J. Jacobi
Inventor
By C. A. Snow & Co.
Attorneys.

Aug. 18, 1931.   F. J. JACOBI   1,819,682
MOTOR VEHICLE HEADLIGHT
Filed Feb. 26, 1930   3 Sheets-Sheet 2
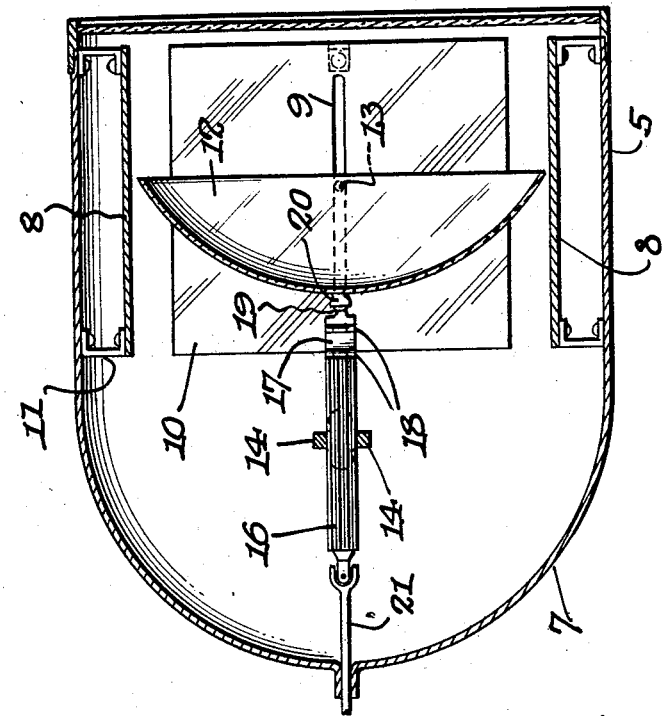
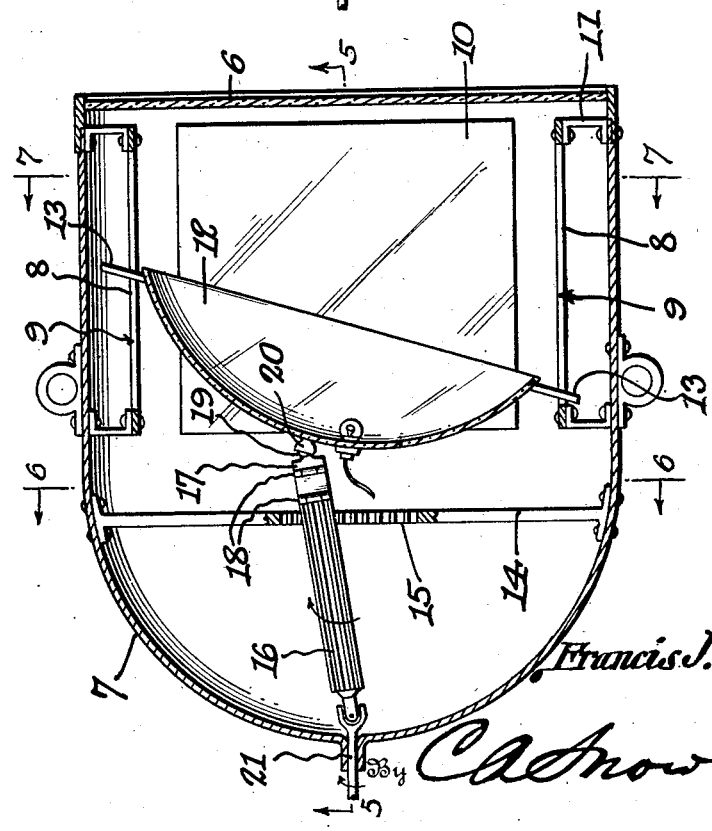
Francis J. Jacobi
Inventor
By C. A. Snow & Co.
Attorneys Aug. 18, 1931.  F. J. JACOBI  1,819,682

MOTOR VEHICLE HEADLIGHT

Filed Feb. 26, 1930  3 Sheets-Sheet 3

Francis J. Jacobi
Inventor

By C.A.Snow&Co.
Attorneys.

Patented Aug. 18, 1931

1,819,682

UNITED STATES PATENT OFFICE

FRANCIS JOSEPH JACOBI, OF FLOYDS KNOBS, INDIANA

MOTOR VEHICLE HEADLIGHT

Application filed February 26, 1930. Serial No. 431,491.

This invention relates to motor vehicle headlights, the primary object of the invention being to provide novel means controlled by the operator, for adjusting the reflectors to control the light rays projected from the headlights.

Another object of the invention is to provide a device of this character which may be operated to direct light rays laterally so that the sides of the road may be clearly illuminated.

A still further object of the invention is to provide a device of this character which may be readily installed, and one which will not necessitate making extensive alterations in the construction of the motor vehicle, to mount the device.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view, illustrating a device constructed in accordance with the invention, as installed.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5 is a sectional view taken on line 5—5 of Figure 4.

Figure 7:
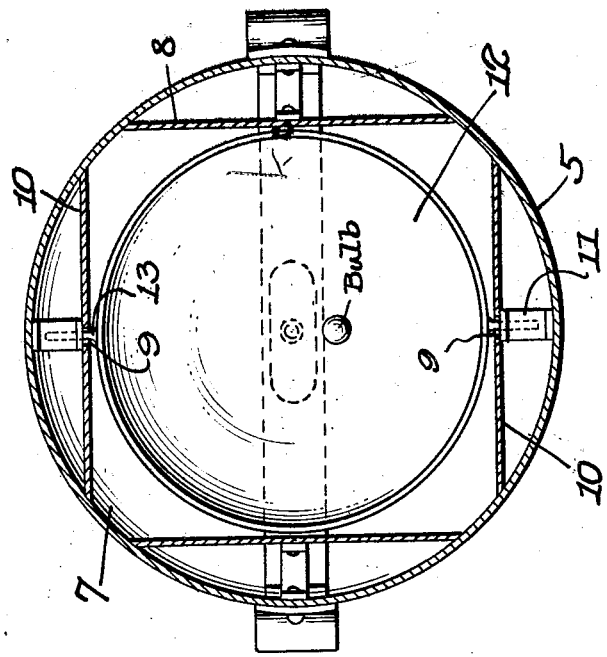
Figure 7 is a sectional view taken on line 7—7 of Figure 4.
Figure 6:
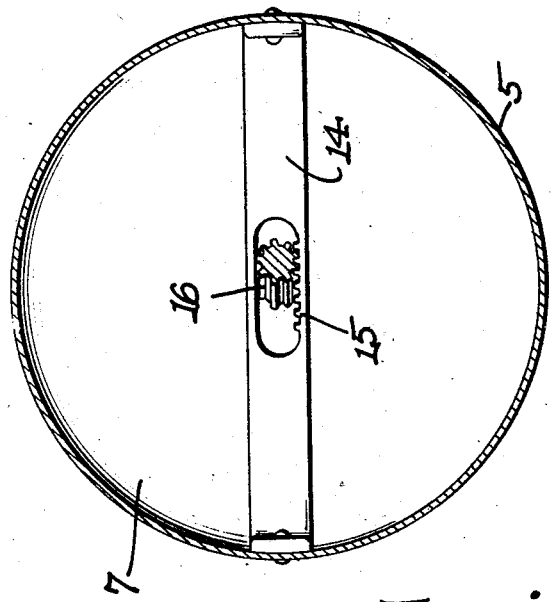
Figure 6 is a sectional view taken on line 6—6 of Figure 4.

Referring to the drawings in detail, the reference character 5 designates a headlight of a motor vehicle which includes an elongated body portion provided with the usual lens 6 at its forward end and a curved rear portion 7.

Positioned within the body portion and arranged on opposite sides thereof are reflectors 8 which are provided with slots 9 disposed throughout the lengths thereof, the slots being arranged intermediate the edges of the reflectors. Upper and lower reflectors 10 are also disposed within the body portion of the headlight and are arranged in spaced relation with the reflectors 8. Brackets 11 are secured to the inner surfaces of the body portion and provide means for supporting the reflectors 8 and 10.

Operating within the body portion is a curved reflector 12 which is provided with laterally extended pins 13 that move in the slots 9 of the reflectors 8. These pins 13 are substantially long so that the reflector 12 may be tilted to various angles to cause the light rays from the lamp to be directed laterally to illuminate the sides of the road over which the vehicle is moving.

Secured within the body portion is a horizontal bar 14 which is formed with an elongated opening, one edge thereof being supplied with teeth 15 to be engaged by the teeth of the elongated gear 16 which is shown as positioned within the opening of the bar 14. At one end of the gear 16 is a connecting member 17 which is connected to the gear 16 by means of the hinges 18, there being provided a head 19 on the member 17, which is fitted in the socket 20 extending rearwardly from the curved reflector 12.

Thus it will be obvious that due to this construction the gear 16 may tilt or swing with respect to the curved reflector 12, to adjust the curved reflector in a manner as described.

Connected with one end of the elongated gear 16 is an operating rod 21 which extends rearwardly, terminating at a point adjacent to the instrument board of the motor vehicle, where it is mounted in the bracket 22. The rod 21 is provided with a gear 23 which meshes with the worm 24 formed on one end of the shaft 25. Brackets 22 are carried by the shaft 25 to move therewith. The shaft 25 is extended through the arm 26 that in turn is secured to the instrument board, the arm 26 being provided with an elongated opening to receive the shaft 25, as clearly shown by Figure 3 of the drawings. A gear 27 is also mounted on the shaft 25 to move therewith, the gear 27 being engaged by the worm gear 28 mounted at the forward end of the operating rod 29 which is rotated in the bearing 30 of the bracket 31. The reference character 32 designates a yoke that is mounted on the rod 29 between the pins 33, the yoke having bearings or openings through which the shaft 25 extends so that the shaft may be operated by the worm 28 and gear 27, or may be slid forwardly or rearwardly by pushing or pulling on the rod 29.

When it is desired to move the reflector 12 forwardly to confine the light rays to a point directly in front of the headlight, the rod 29 is pressed forwardly, moving the rod 21 and gear 16 forwardly so that the reflector 12 takes a position in close proximity to the lens 6 of the headlight.

To tilt the reflector 12 in a manner as shown by Figure 4 of the drawings, the rod 29 is rotated to cause the rod 21 and gear 16 to be rotated, whereupon the gear 16 is moved over the teeth 15, causing a twisting movement of the reflector 12 to direct light rays laterally.

While I have described an operating means for a single headlight, it is to be understood that the shaft 25 is provided with operating means at both of its ends so that a pair of rods 21 may be operated to control the movable reflectors of both headlights of the vehicle.

I claim:

1. A headlight comprising a body portion, a movable reflector operating within the body portion, means for holding the movable reflector against lateral movement, an operating member including an elongated gear, an operating rod, a universal coupling between the rod and elongated gear, to rotate the elongated gear, means for causing one end of the elongated gear to move vertically when the gear is rotated, and a universal coupling for connecting the elongated gear and movable reflector to tilt the movable reflector, when the gear is rotated.

2. A headlight comprising a body portion, a tilting reflector mounted within the body portion, an operating rod, an elongated gear connected with the operating rod, said gear having swivel connection with the movable reflector, a bar having an elongated opening, positioned within the body portion, one wall of the opening having teeth to be engaged by the teeth of the elongated gear to raise and lower one end of the elongated gear as the elongated gear is rotated, and said elongated gear adapted to tilt the movable reflector within the body portion.

In testimony that I claim the foregoing as my own, I have hereto affixed my signature.

FRANCIS JOSEPH JACOBI.